US 9,857,802 B2

(12) United States Patent
Yates et al.

(10) Patent No.: US 9,857,802 B2
(45) Date of Patent: Jan. 2, 2018

(54) GASEOUS FUEL CONTROL DEVICE FOR ENGINES

(71) Applicant: Continental Controls Corporation, San Diego, CA (US)

(72) Inventors: Kristian W. Yates, Valley Center, CA (US); David G. Fisher, Carlsbad, CA (US); Galina Laur, San Diego, CA (US); Hillary H. Grimes, III, San Diego, CA (US)

(73) Assignee: Continental Controls Corporation, San Diego, CA (US)

( * ) Notice: Subject to any disclaimer, the term of this patent is extended or adjusted under 35 U.S.C. 154(b) by 343 days.

(21) Appl. No.: 14/704,353

(22) Filed: May 5, 2015

(65) Prior Publication Data

US 2015/0346733 A1 Dec. 3, 2015

Related U.S. Application Data

(60) Provisional application No. 62/005,384, filed on May 30, 2014.

(51) Int. Cl.
*F02M 21/02* (2006.01)
*G05D 7/06* (2006.01)
*G05B 13/02* (2006.01)

(52) U.S. Cl.
CPC .......... *G05D 7/0635* (2013.01); *F02M 21/02* (2013.01); *F02M 21/0218* (2013.01); *G05B 13/0205* (2013.01)

(58) Field of Classification Search
CPC .. F02M 21/02; F02M 21/0218; F02M 21/023; F02M 21/0239; G05D 7/06; G05D 7/0635; G05B 13/0205
See application file for complete search history.

(56) References Cited

U.S. PATENT DOCUMENTS

| 5,756,890 A | 5/1998 | Fedison |
| 6,978,774 B2 | 12/2005 | Fisher |
| 7,069,137 B2 | 6/2006 | Miller |

(Continued)

FOREIGN PATENT DOCUMENTS

JP 2007-332829 A 12/2007

OTHER PUBLICATIONS

International Search Report and Written Opinion for PCT Application No: PCT/US2015/031739 dated Aug. 27, 2015, 18 pgs.

(Continued)

*Primary Examiner* — Jacob Amick
(74) *Attorney, Agent, or Firm* — Procopio, Cory, Hargreaves & Savitch, LLP (57) ABSTRACT

A fuel control device or fuel valve assembly includes a valve for metering flow of gaseous fuel to an engine, a drive device associated with the valve to adjust the effective flow area of the valve, a flow meter with at least one fixed area orifice located upstream of the valve, and one or more sensors to measure predetermined parameters of the fuel flowing through the flow meter. A controller receives input from the flow sensor or sensors and a fuel demand signal from the engine control, calculates current flow rate based on the sensor inputs, and controls the drive device to adjust the valve flow area up or down depending on the difference between the calculated flow rate and current fuel demand signal.

19 Claims, 8 Drawing Sheets

(56) References Cited

U.S. PATENT DOCUMENTS

| | | | |
|---|---|---|---|
| 8,005,603 B2* | 8/2011 | Fisher | F02D 31/002 |
| | | | 123/527 |
| 2005/0097945 A1 | 5/2005 | Flores et al. | |
| 2006/0157027 A1 | 7/2006 | Ichikawa et al. | |
| 2012/0046886 A1* | 2/2012 | Bowling | G01M 15/09 |
| | | | 702/47 |

OTHER PUBLICATIONS

Woodward TecJet 52, Intelligent Electronic Gas Metering Valve, Product Specification 03355, Jul. 2010.
Continental Controls Corporation, Gas Fuel Metering Valve AGV10, Introduced 2008.
Continental Controls Corporation, Gas Fuel Metering Valve AGV50, Introduced 2008.

* cited by examiner

GASEOUS FUEL CONTROL DEVICE FOR ENGINES

FIELD OF THE INVENTION

The present invention relates generally to processes or systems involving closed loop flow control of a gas, such as closed loop fuel control systems for engines, and is particularly concerned with a fuel control device for use in such a closed loop control system to control gaseous fuel flow to an engine based on a fuel flow demand signal.

BACKGROUND OF THE INVENTION

In current closed loop fuel control systems for engines, the ECM (electronic control module) of an engine such as an industrial reciprocating engine generates a fuel demand signal based on various engine parameters. This fuel demand signal is compared to a measured flow rate and a valve is actuated to make any adjustment needed. Current closed loop flow control valves have problems in accurately measuring fuel flow rate that may limit their performance. The Tecjet manufactured by Woodward Governor of Fort Lauderdale, Fla. attempts to measure the flow across a butterfly valve. This method requires additional variables for calculating flow which result in increased errors. One of these variables is the area of the butterfly valve which is not linear with rotation. The area is calculated based on the measured rotation of the butterfly. Any error in the position measurement will result in an error in the flow calculation.

Determining an accurate discharge coefficient is another problem. A butterfly valve has a discharge coefficient that varies with both position and pressure. An accurate flow measurement would require a complex map of pressures, position, and corresponding discharge coefficients. In some applications, the flow across the metering valve transitions from sonic to subsonic. This requires a separate flow equation for each condition. The valve must now try to detect when this transition occurs and switch to the appropriate calculation. This introduces added complexity and potential error.

The XVG valve manufactured by Precision Engine Controls Corp. of San Diego, Calif. is similar to the Woodward Tecjet but it uses a flow metering tube instead of a butterfly valve. It suffers from the same problems associated with trying to measure flow across a variable area.

The AGV10 and AGV50 valves manufactured by Continental Controls Corporation of San Diego, Calif. also include flow measurement with closed loop flow control and use restrictive flow measurement devices with fixed areas. These valves were designed specifically for high pressure gas turbines and use a much more complex balanced poppet design for metering fuel. They also have the flow meter located downstream of the metering poppet in order to take advantage of the rising outlet pressure created by the compressor of the gas turbine. This makes an accurate flow measurement more difficult due to a non-uniform flow profile and turbulence created by the metering poppet.

SUMMARY OF THE INVENTION

Embodiments described herein provide a fuel control device or fuel control valve assembly with an integrated flow meter for use in closed loop flow control of gaseous fuel to an engine.

In one embodiment, the fuel control device or assembly comprises a flow control housing having a gaseous fuel inlet, a metered gaseous fuel outlet, and a flow passageway between the fuel inlet and outlet; a flow control valve in the passageway for metering flow of fuel to an engine, a drive device associated with the valve to adjust the effective flow area of the valve, a flow measurement device or flow meter with at least one fixed area orifice located in the passageway upstream of the valve, one or more sensors to measure predetermined parameters of the fuel flowing through the flow meter, and a controller which receives input from the flow sensor or sensors as well as a fuel demand signal from the engine. The controller calculates current flow rate based on the sensor inputs and controls the drive device to adjust the valve flow area up or down depending on the difference between the calculated flow rate and current fuel demand signal.

In one embodiment, the controller includes a flow rate processing module which calculates flow rate through the flow meter based on the sensor outputs, a comparator module which compares the calculated flow rate to the engine fuel demand signal, and a valve control module which has an output connected to actuate the drive device in order to adjust the effective flow area of the flow control valve based on the difference between the calculated flow rate and engine fuel demand signal.

In one embodiment, the flow measurement device or flow meter is a venturi which has a fixed area inlet port and a reduced area orifice or throat downstream of the inlet port, and sensors are provided to detect pressure at the inlet port and throat of the venturi as well as fuel temperature, so that pressure drop of the gas from the inlet to the throat of the venturi, as well as the absolute pressure and the temperature can be used to calculate current mass flow rate using Bernoulli's principle and the conservation of energy principle. In alternative embodiments, the venturi may be replaced with other restrictive elements with fixed areas, such as an orifice plate.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Embodiments described herein provide for a gaseous fuel control or fuel valve assembly or device with an integrated flow meter used for closed loop fuel flow control of fuel supply to an engine.

Figure 5A:
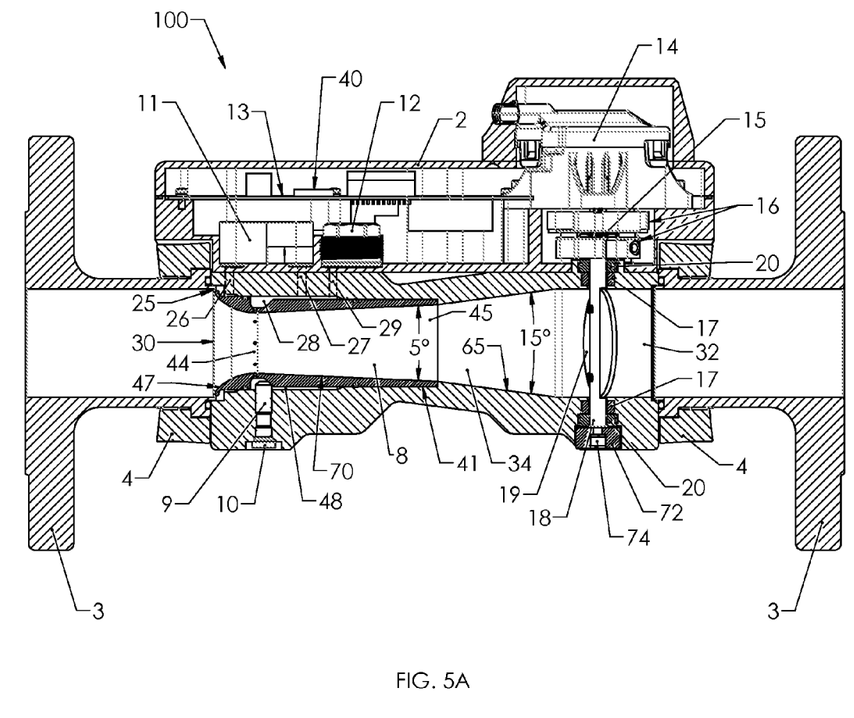
FIG. 5A is a cross-section of one embodiment of the fuel control device on the lines 5-5 of FIG. 2.
Figure 5B:
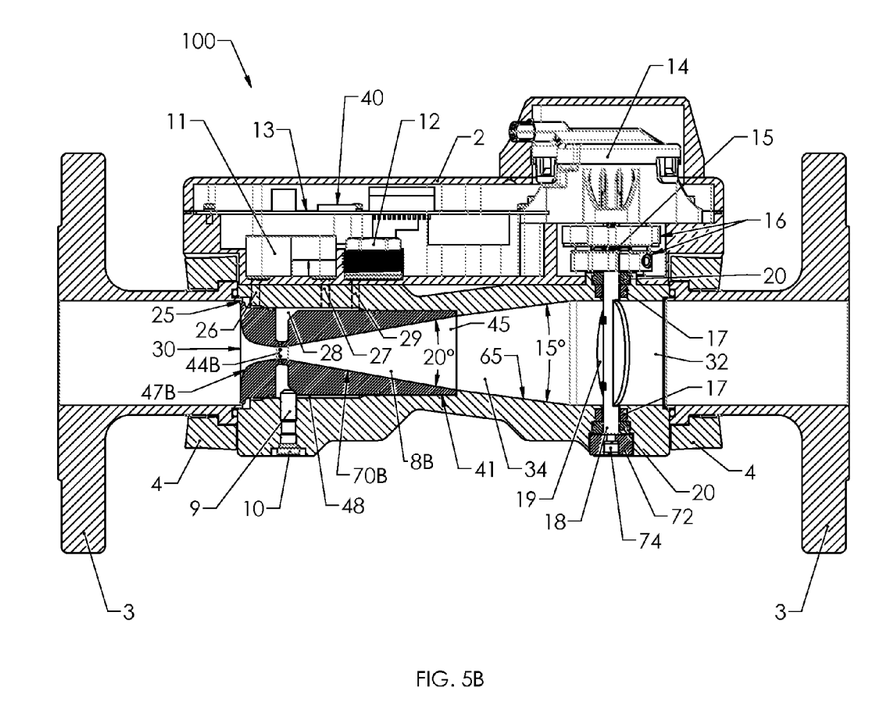
FIG. 5B is a cross-section similar to FIG. 5A but with a modified venturi having different dimensions.
Figure 6:
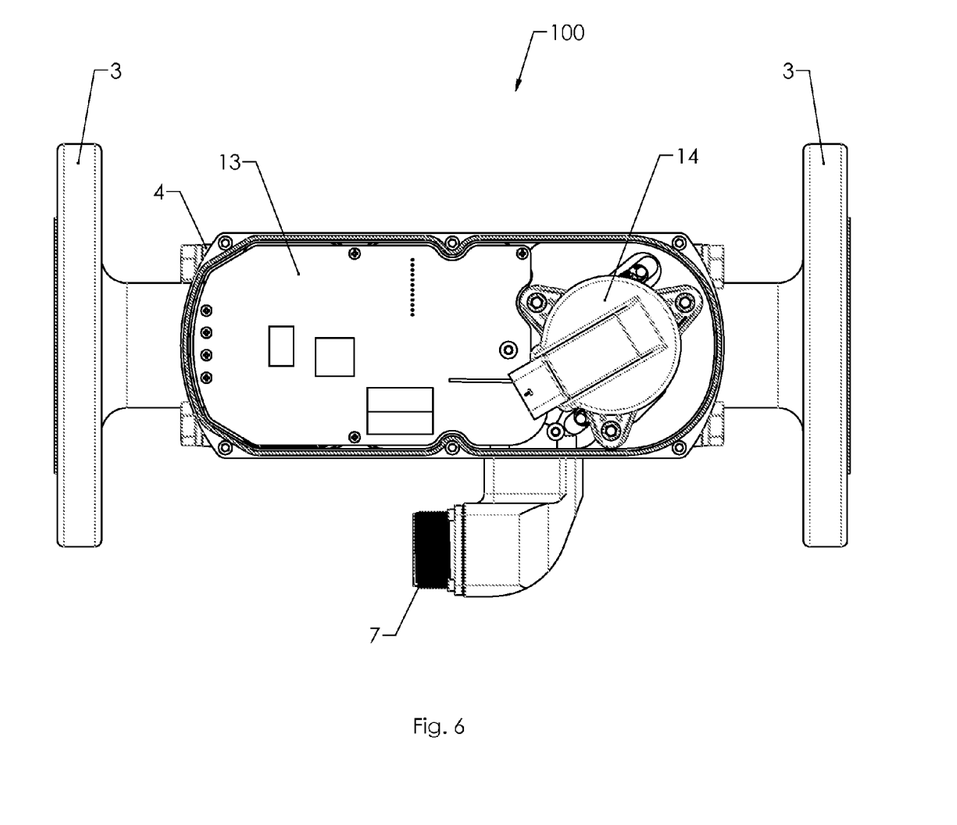
FIG. 6 is a top plan view of the fuel control device similar to FIG. 2, but with the control housing covers removed to reveal the interior of the housing.
Figure 8:
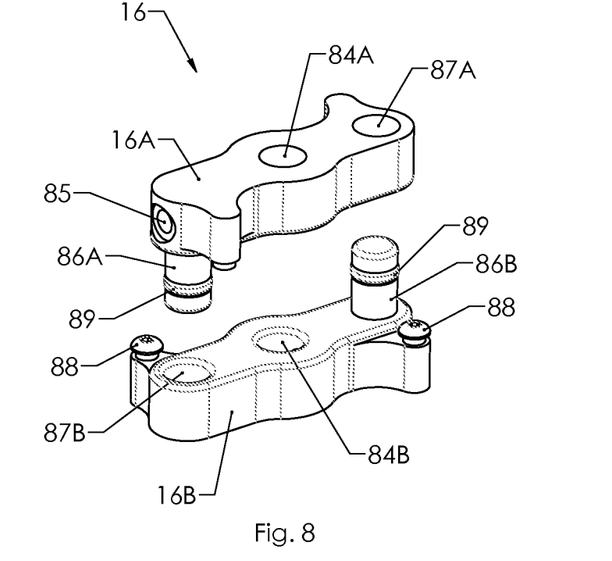
FIG. 8 is a perspective, exploded view of the coupler assembly of FIG. 7, showing the coupler pair separately.
Figure 9:
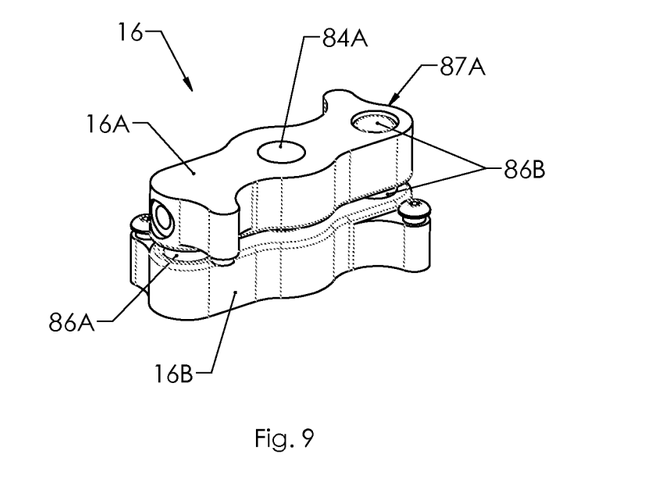
FIG. 9 is perspective view similar to FIG. 8, showing the coupler pair of FIG. 8 engaged.
Figure 10:
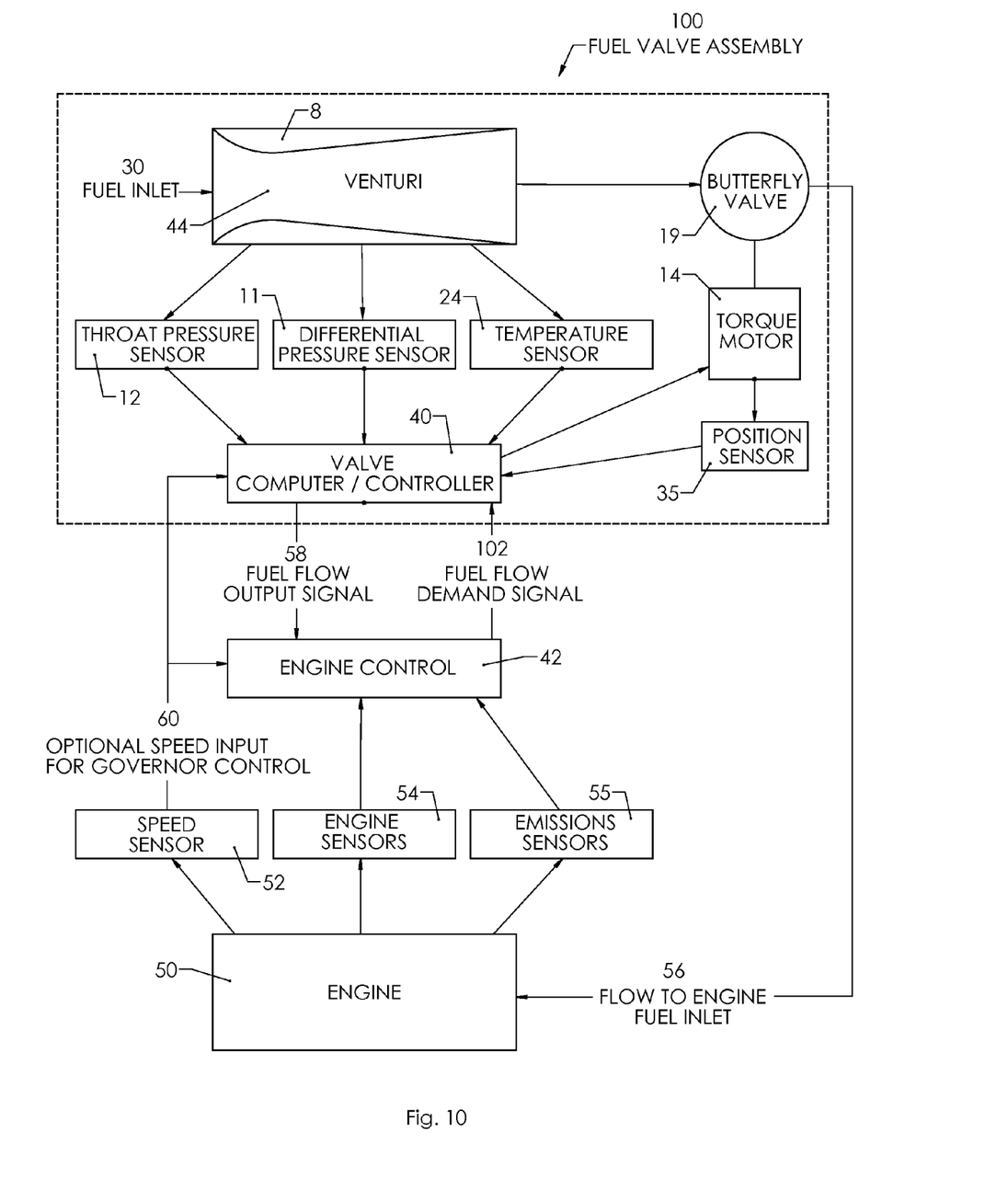
FIG. 10 is a schematic block diagram of one embodiment of a closed loop fuel control system using the fuel control device of FIGS. 1 to 9.

FIGS. 1 to 9 illustrate one embodiment of a fuel control valve assembly or device 100 comprising a one or two part housing containing fuel metering components and a controller, with FIG. 5A illustrating one embodiment of a venturi flow meter in the fuel path and FIG. 5B illustrating another embodiment with a venturi flow meter of different dimensions, as described in more detail below. In the illustrated embodiment, the housing is in two parts 1, 2 comprising fuel metering enclosure or housing part 1 containing fuel metering components and a control enclosure or part 2 containing the controller and associated sensors, as described below. However, in alternative embodiments, a single or unitary housing may be provided for containing all parts of the control valve assembly. FIG. 10 is a schematic block diagram illustrating one embodiment of a closed loop fuel control system for an engine using the fuel control valve assembly or device of FIGS. 1 to 9.

The fuel control device or assembly 100 basically comprises flow control housing 1, 2, a flow control valve 19 for metering flow of fuel to an engine, a drive device or motor 14 associated with the valve 19 to adjust the effective flow area of the valve, and a flow measurement device or flow meter 8 with at least one fixed area orifice located upstream of the valve 19, as best illustrated in FIG. 5A. One or more sensors 11, 12, 24 (see FIGS. 5A and 7) measure predetermined parameters of the fuel flowing through the flow meter, and a controller 40 in housing 2 receives input from the flow sensor or sensors and a fuel demand signal from the engine's electronic control module (ECM) 42 as seen in FIG. 10. Controller 40 calculates current flow rate based on the sensor inputs and controls the drive device or torque motor 14 to adjust the valve flow area up or down depending on the difference between the calculated flow rate and current fuel demand signal from ECM 42, as described in more detail below.

Flow metering housing 1 has a through bore or passageway 34 and flow control valve 19 is mounted in bore 34 close to the outlet port 32 for controlling or adjusting fuel flow out of the housing, as seen in FIG. 5A. Flow meter or flow measuring device 8 is mounted in passageway 34 upstream of flow control valve 19 and is used in conjunction with various sensors to measure the fuel flow rate or mass flow rate. In the illustrated embodiment, flow meter 8 is a venturi, but other restrictive flow elements with fixed areas may be used in alternative embodiments in place of the venturi 8, such as an orifice plate. As discussed in more detail below, the venturi of the illustrated embodiment is sized based on the operating pressure and flow rate for the application, and FIG. 5B illustrates a modified venturi flow meter 8B of smaller dimensions. Modified parts of venturi meter 8B are provided with the same reference numbers as FIG. 5A followed by the letter B, while all other components in FIG. 5B are identical to those of FIG. 5A, and like reference numbers are used for like parts as appropriate. The description below refers to FIG. 5A but is equally applicable to metering using the smaller orifice venturi 8B of FIG. 5B.

Figure 1:
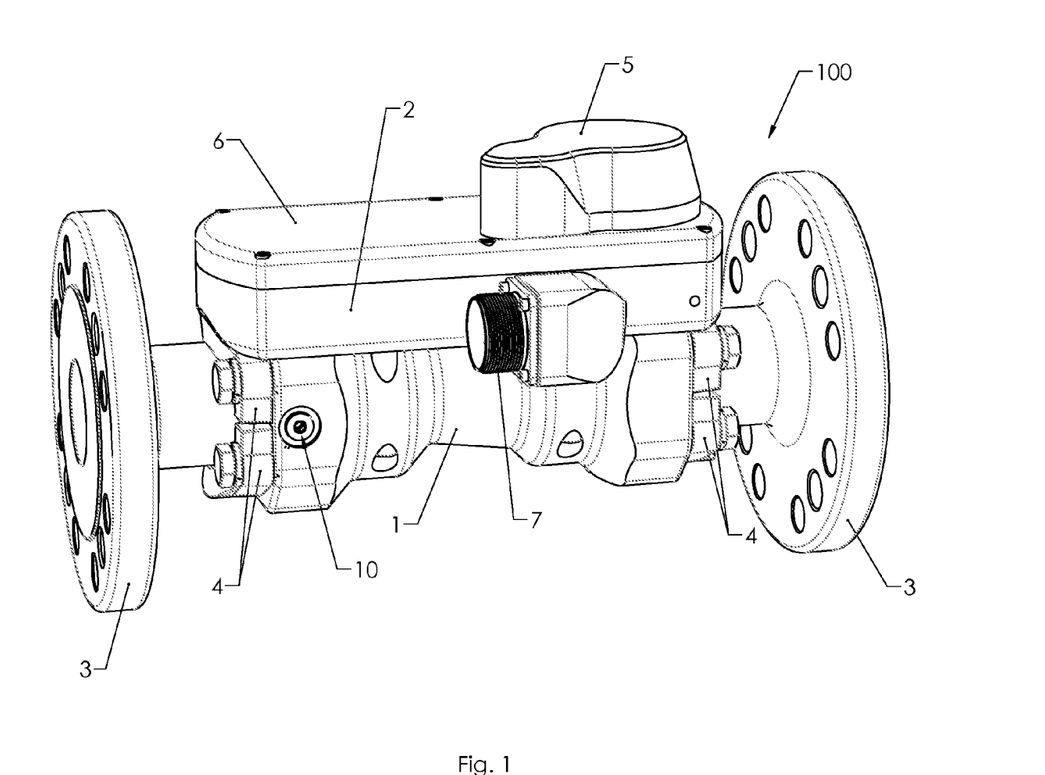
FIG. 1 is a perspective view of one embodiment of a fuel control device or assembly with an integrated flow meter used for closed loop flow control.
Figure 2:
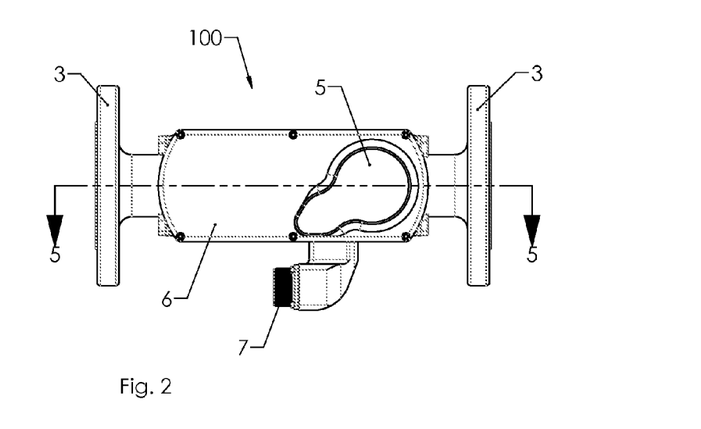
FIG. 2 is a top plan view of the fuel control device of FIG. 1.
Figure 3:
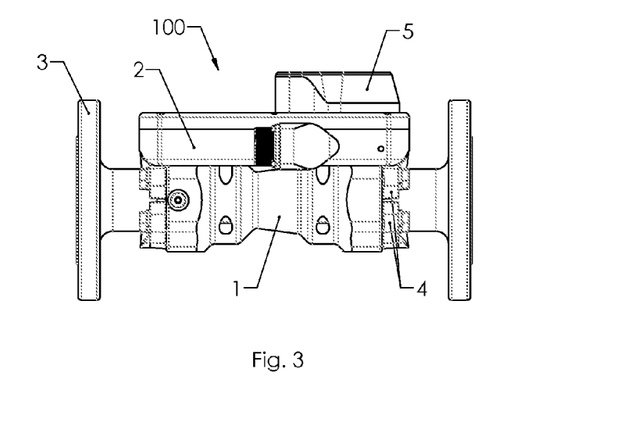
FIG. 3 is a side elevation view of the fuel control device of FIGS. 1 and 2.
Figure 4:
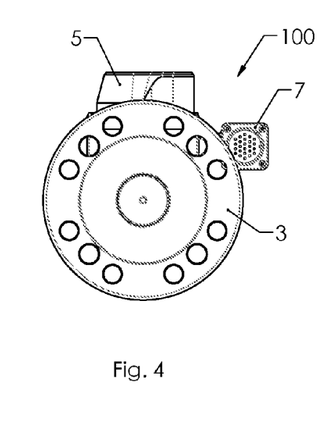
FIG. 4 is an end view of the fuel control device of FIGS. 1 to 3.

In the illustrated embodiment, control enclosure 2 has a cover 6 (see FIG. 1) for access to the controller and sensors for maintenance purposes. As best illustrated in FIGS. 1 and 5, fuel inlet and outlet ports 30, 32 at opposite ends of passageway 34 extending through metering housing 1 are secured to flange adapters 3 via split flanges 4 which allow the fuel control unit to be easily adapted to various flange requirements, depending on the engine system in which it is to be installed. An external connector or electrical connector 7 (see FIGS. 1, 2 and 4) is used for all electronic interface and communications to and from the fuel control device 100. Wireless communication may be used in alternative embodiments.

Fuel flow out of port 32 is metered or controlled by the flow control valve, which comprises a butterfly valve 19 in the illustrated embodiment. The butterfly valve 19 includes a disk mounted on a shaft 18 which crosses the main bore or passageway 34 of the metering housing 1, with shaft 18 secured across the diameter of disk. In one embodiment, a two inch butterfly valve was used. Opposite ends of shaft 18 are rotatably supported by a respective bushing 20 and annular rotary shaft seal 17, and a thrust washer 72 is mounted to the lower end of shaft 18 via screw 74. Rotary torque motor or butterfly valve drive motor 14 is located in a part of the control housing 2 above butterfly valve 19 which is covered by cover or cap 5, and the upper end of the valve shaft 18 extends through an aligned through bore in the wall of housing 1 for attachment to the torque motor shaft via coupler assembly 16, as described in more detail below with reference to FIGS. 7 to 9. The location of the torque motor can also be adjusted radially in order to align with the axis of the butterfly shaft. The upper end of the shaft 18 is sealed with low friction, annular rotary shaft seal 17 mounted in the metering housing 1, as illustrated in FIGS. 5A and 5B. Alternative embodiments may include a soft seat design to reduce leakage across the butterfly valve when in the closed position.

The torque motor 14 is used to rotate the butterfly valve and vary the effective metering area by rotating the disk of butterfly valve to any selected position between an orientation transverse to the longitudinal axis of flow passageway 34 and an orientation parallel to the axis (fully open). The motor 14 includes a position sensor 35 (see FIG. 10) for closed loop position control. Coupler assembly 16 located in the control housing attaches the torque motor drive shaft (not visible in the drawings) to the upper end of butterfly shaft 18. One part of the coupler assembly is secured to the shafts using set screws which are seated against a corresponding flat on each shaft. As illustrated in FIGS. 8 and 9, coupler assembly 16 comprises a pair of couplers 16A and 16B, separated for clarity in FIG. 8. The top coupler 16A mounts to the drive shaft of motor 14 using bore 84A and a set screw 85. The lower coupler 16B mounts to butterfly shaft 18 via bore 84B using a second set screw 85 (not visible in FIGS. 8 and 9). A first pin or connecting post 86A extends downward from one end of top coupler 16A, while a second pin or connecting post 86B extends upward from the opposite end of lower coupler 16B. Pin 86A engages an opposing bore 87B in coupler 16B with a loose fit, and pin 86B engages opposing bore 87A in coupler 16A with a similar loose fit, to allow for misalignment between motor 14 and shaft 18. O-rings 89 fit snugly into bores 87A, 87B to dampen the backlash created by the loose fit.

Figure 7:
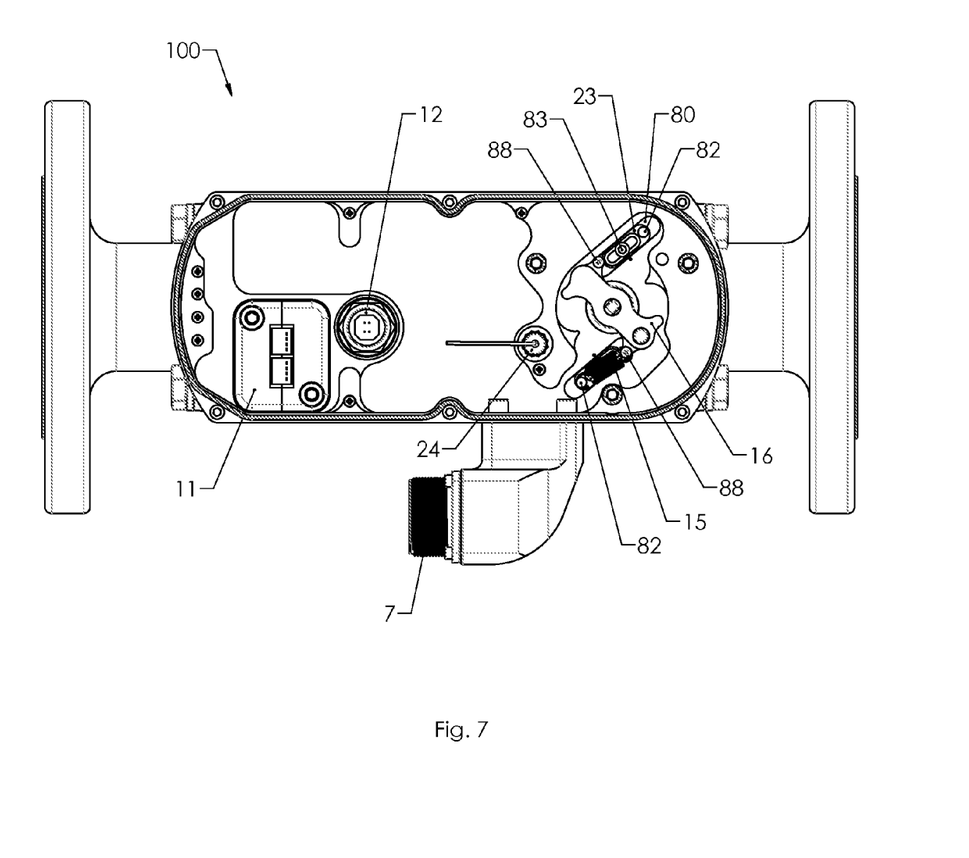
FIG. 7 is a top plan view similar to FIG. 6 but with the covers, motor, and controller circuit board removed to reveal the pressure sensors, temperature sensor, and coupler assembly between the motor shaft and valve positioning shaft.

The lower coupler 16B includes threaded bores receiving respective screws 88, which are used for mounting ends of return springs 15 which force the butterfly valve into a normally closed position. The opposite ends of the springs are attached to spring adjusters 23. One of the springs 15 is removed in FIG. 7 to illustrate one of the spring adjusters 23. As illustrated in FIG. 7, spring adjusters 23 are mounted in respective slots 80 via screws 83 used to adjust the preload on the butterfly valve. Each spring adjuster 23 is adjustable parallel to slot 80. Return spring 15 mounts over post 82 of adjuster 23 at one end, and over the screw 88 at a respective end of lower coupler 16B at the other end. The applied torque profile of the springs can be manipulated by changing the location of the spring mounts 82 along slots 80 in relation to the axis of the butterfly shaft, then re-tightening the respective adjuster screw. This feature is used to create a return spring torque profile that is complimentary to the rotary torque motor profile.

The venturi flow meter or flow measurement device 8 is located upstream of the butterfly valve 19 at a spacing sufficient to avoid undue turbulence in gas flowing through the venturi, and is used in conjunction with various sensors to measure flow. A set screw 9 is used to secure the venturi to the metering housing and plug 10 seals the threaded hole of the set screw. The venturi is specifically designed to fit upstream of the butterfly valve in order to avoid the turbulence created by flow through valve 19. As best illustrated in FIG. 5A, venturi or flow measurement device 8 has a fuel inlet port or inlet end 30 and a smooth curved inner surface 47 extending from inlet annulus to reduced diameter throat 44, followed by a smooth outwardly tapering surface 70 from throat 44 to venturi outlet 45 into passageway 34 between the venturi and the butterfly valve. The inner surface of the venturi is designed to be smooth with no sharp transitions, to reduce or minimize turbulence created in gas or fuel flowing through the venturi and produce more accurate flow rate measurements. Passageway 34 has an outwardly tapered surface portion 65 extending from venturi outlet 45 up to the butterfly valve. The gradual taper of the venturi outlet followed by the outwardly tapering surface portion 65 of passageway 34 is also designed to expand the gas slowly from the throat of the venturi and thereby recover a majority of the pressure drop created in the throat. This is an important feature for applications with limited supply pressures where the overall pressure drop across the flow control valve is to be kept to a minimum.

When the venturi is secured in passageway 34 as in FIG. 5A, an inlet pressure annulus or annular chamber 25 is formed between the inlet end of the venturi and an adjacent stepped portion of housing through bore 34. An annular groove or throat pressure annulus 28 is also provided on the outer surface of the venturi device surrounding throat 44, and communicates with throat 44 via a plurality of bores or small openings spaced in a ring around throat 44, as illustrated in FIG. 5A.

Controller 40 is mounted on circuit board 13 inside control housing or chamber 2, and is connected to outputs of a differential pressure sensor 11 and a throat pressure sensor 12 mounted in housing 2 below the circuit board and in communication with the inlet and throat portions of the venturi, as illustrated in FIGS. 5A and 5B. An inlet port 26 extends through housing 1 between inlet pressure annulus 25 of the venturi and the differential pressure sensor 11. First and second throat ports 27, 29 communicate with throat pressure annulus 28 via annular space 48 between the outer surface of venturi 8 and the inner surface of housing 1 extending up to annulus 28. The first throat port 27 is connected to differential pressure sensor 11, while the second throat port 29 communicates with throat pressure sensor 12. Thus, the throat or absolute pressure sensor 12 is ported to the throat of the venturi to detect venturi throat pressure $P_t$, and the differential pressure sensor 11 is ported to both the inlet and throat of the venturi to detect the pressure difference between these locations in the venturi, i.e. $P_i-P_t$, where $P_i$ is the venturi inlet pressure detected via port 26. An RTD (resistance temperature detector) or temperature sensor 24 (see FIGS. 7 and 10) is mounted in the metering housing 1 and is ported to the passageway 34 between the venturi and butterfly valve. Sensor 24 has a gas temperature output T connected to controller 40, as illustrated in FIG. 10.

Alternative embodiments may include a single differential pressure sensor assembly that includes both a high range sensor and a low range sensor. This would be beneficial for applications with high flow turn-down ratios that result in a very wide range for the measured differential pressure. A single sensor sized for the maximum differential pressure generated at a max flow condition could introduce significant errors when measuring much smaller differential pressures at the lowest flows. For example, a 1 psid (pounds per square inch differential) differential pressure sensor could be used to measure differential pressures from 0.01 to 1 psid and 10 psid differential pressure sensor could be used to measure pressures from 1 to 10 psid. If only the 10 psid sensor were used, the differential pressure turn-down ratio is 1000 for the pressure range from 0.01 to 10 psid. When the two sensors are used, the turn-down ratio for the 1 psid sensor is only 100 and the turn-down ratio for the 10 psid sensor is only 10. In this alternative arrangement, the valve software is written to automatically select the correct sensor input based on the measured differential pressure.

The inner diameter of the venturi contracts up to throat 44 in order to accelerate the gas and create a corresponding low pressure region. The lowest pressure occurs at the location with the smallest cross sectional area which is referred to as the throat 44 of the venturi. The venturi is sized based on the operating pressure and flow rate for the application, and is removably mounted in housing 1 via set screw 9. A set of venturi flow meters of different internal dimensions may be proved for use in different applications, with the outer dimensions of each venturi being identical, allowing one metering housing configuration to be manufactured for the entire range of venturi sizes. FIG. 5B illustrates a modified embodiment with a different size venturi 8B replacing venturi 8 in the metering housing 1.

The venturi throat diameter may range from around 0.25 to 1.15 inches. The outlet angle of the taper 70 between throat 44 and outlet 45 may be in the range from around 5 to 20 degrees. The overall length of each venturi in one embodiment is 4.25 inches with passageway 34 adding another 2.25 inches to the tapered outlet. The taper angle of tapered portion 65 of passageway 34 between the outlet end of the venturi and the butterfly valve is around 15 degrees in the illustrated embodiment.

The venturi is seated as far upstream of butterfly valve 19 as possible to allow for the gradual outward taper between throat 44 and butterfly valve 19, and in the illustrated embodiments the venturi inlet 30 is located adjacent the inlet end of housing 1. The axial location of the throat is the same for all venturi diameters and is as close to the inlet end 30 of the venturi as reasonably possible in order to allow for a longer outlet with a gradual taper, while still providing a relatively smooth transition from the inlet to the throat. Thus, each venturi has a short inlet design with a gradual outlet taper while still keeping the overall length as short as possible. The venturi is located as far upstream of valve 19 as possible with a short inlet design and the inlet pressure annulus 25 located directly at the inlet of the venturi and not further upstream as in other venturi designs.

The inlet curvature 47 is varied in order to create a smooth transition from the inlet to the throat for each venturi size. In FIG. 5A, the throat diameter is around 0.95 inches and the outlet angle of the taper 70 from the throat to outlet end 45 is around 8.5 degrees. The throat 44B of the venturi 8B of FIG. 5B has a diameter of around 0.25 inches and an outlet angle of taper 70B of around 20 degrees. The inlet curvature 47B is different from that of venturi 8 and is designed to create a smooth transition from the inlet to smaller throat 44B.

Although a venturi is used as the flow meter in the illustrated embodiments, other flow element designs could be used in alternative embodiments, but there are always tradeoffs. For example, an orifice plate is cheaper to manufacture and can fit into a shorter housing, but there is inherently no recovery of the pressure drop for this type of device. A venturi with a constant 5 degree outlet has the best pressure recovery, but it would be significantly longer especially for the smaller sizes. This would make manufacturing more difficult and more expensive. The illustrated designs are a compromise between performance, length and cost.

Mass flow rate is calculated by controller 40 using the temperature T of the gas, the absolute pressure $P_t$ of the gas, and the pressure drop of the gas ($P_i-P_t$) from the inlet of the venturi to the throat of the venturi. The flow measurement is based on Bernoulli's principle which states that as the speed of a fluid (liquid or gas) increases the corresponding pressure of the fluid decreases simultaneously. Various equations based on this principle can be used to calculate flow, and one example of calculating flow rate through the venturi is provided below. In one embodiment, the outputs of the sensors are wired to the onboard computer or controller 40 located in the control housing as illustrated in the drawings. In other embodiments, the controller may be separate from the flow control unit and sensor output and control inputs may be provided by wiring or wireless communication between the flow control unit and controller. Flow is calculated by a high speed processor and embedded software of controller 40, as described in more detail below.

In one example, flow may be calculated according to the following equation:

$$W_f = C_{gas} * C_d * A * \sqrt{[(P_t*(P_i-P_t))/T]},$$

Where $W_f$=mass flow rate $C_{gas}$=constant based on the type of gas being measured and the mass flow rate units $C_d$=venturi discharge coefficient A=venturi throat area $P_t$=venturi throat pressure (output of sensor 12)

$P_i$=venturi inlet pressure ($P_i-P_t$ is the output of differential sensor 11)

T=gas temperature (i.e. output of sensor 24)

Discharge coefficients are available for some standard flow elements such as an orifice plates and a venturi, but they only provide an approximation. In one embodiment, the venturi is installed in the flow control device 100 and the discharge coefficient is calibrated on a test bench to determine the actual $C_d$. Calibration of the complete assembly accounts for potential effects from all components upstream and downstream of the venturi. The $C_d$ can vary over a given flow range and calibrations may be made at multiple flow rates to account for this variation, in order to provide an accurate mass flow rate. These calibration values may be stored in a data storage module of controller 40 and the closest calibrated $C_d$ can then be used in the calculation above, according to embedded software or program instructions of a processing module of the controller 40.

The calculated flow is used for closed loop flow control. A typical application would be for controlling the flow of natural gas to an industrial reciprocating engine. FIG. 10 illustrates one embodiment of a closed loop fuel control system of an engine using fuel control device or fuel valve assembly 100 of FIGS. 1 to 7. The ECM (electronic control module) 42 of the engine 50 generates a fuel demand signal 102 based on various engine parameters including but not limited to; speed, load, manifold temperature, manifold pressure, exhaust emissions, air fuel ratio, intake air flow. FIG. 10 illustrates a speed sensor 52, engine sensors 54, and emissions sensors 55 connected to the engine control or ECM 42. The fuel demand signal 102 is communicated to the computer 40 of the flow control device 100 and compared to the measured flow rate from the equation above, and an output control signal from the controller 40 is used to actuate torque motor 14 to make any necessary adjustment of the butterfly valve opening so as to adjust the flow rate of fuel into the engine fuel inlet 56. A fuel flow output signal 58 is also provided as feedback from computer 40 to ECM 42. This signal 58 is the current calculated fuel flow rate, and can be used for control, diagnostics, or reporting purposes. Using known PID (proportional integral derivative) control strategies, the butterfly valve is actuated via the illustrated control loop feedback mechanism in order to reduce or eliminate any errors between the flow demand signal and the measured flow. The position feedback from position sensor 35 of the torque motor is used in an inner control loop to help improve stability and response. It is also used for diagnostics.

In one embodiment, the computer or controller 40 of fuel control device or apparatus 100 may also have an engine speed input 60 from an engine speed sensor 52, as illustrated in FIG. 10. This allows the fuel control unit 100 to operate as a governor and directly control engine speed via the fuel input to the engine.

The flow control device of the above embodiments is an improvement over prior art devices which attempt to measure flow across a butterfly valve, which has a flow area which is not linear with rotation of the valve, and also has a discharge coefficient which varies with both position and pressure. Accurate flow measurement in such devices requires a complex map of pressures, position, and corresponding discharge coefficients. Similar problems arise when a flow metering tube is used for flow measurement. The problems of trying to measure flow across a variable area are eliminated by using a flow measurement device with a fixed area. A venturi has a relatively constant and predictable discharge coefficient, unlike a butterfly valve. The flow control or fuel valve assembly 100 also places the flow meter 8 in a low turbulence part of the fuel flow path, so the measurement of mass flow rate is more accurate than in prior art devices where the flow meter is located downstream of the flow metering valve, where accurate flow measurement is more difficult due to turbulence.

Although the above embodiments describe a flow control device or assembly for use in control of gaseous fuel flow to an engine, the flow control device could also be used in any process requiring closed loop flow control of a gas.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A gaseous fuel control assembly comprising:
   a flow control valve housing having a gaseous fuel inlet, a metered gaseous fuel outlet for fuel supply to an engine, and a passageway between the gaseous fuel inlet and outlet;
   a flow control valve mounted in the passageway having an adjustable flow area for metering flow of fuel to an engine;
   an adjustment device associated with the flow control valve to adjust the effective flow area of the valve;
   a flow measurement device having at least one fixed area orifice located upstream of the flow control valve, and at least one sensor associated with the orifice and configured to measure predetermined parameters of the fuel flowing through the orifice, the flow measurement device comprising a venturi secured in the passageway, the venturi having a fixed area inlet port, a reduced area throat downstream of the inlet port, and an outlet downstream of the throat; and
   a controller which receives input from the at least one sensor and a fuel demand signal from the engine, the controller having a processing module for calculating current flow rate based on the sensor input, a comparator module which compares the calculated flow rate with the fuel demand signal, and a valve control module which controls the adjustment device to adjust the flow area of the flow control valve up or down depending on the difference between the calculated current flow rate and current fuel demand signal;
   wherein the at least one sensor comprises at least one pressure sensor for sensing pressure of gas at the venturi throat, the venturi having an outer surface conforming to an opposing inner surface of the passageway along at least part of the length of the venturi, a throat pressure annulus between the outer surface of the venturi and inner surface of the passageway at a location surrounding the venturi throat, and a plurality of openings spaced around the venturi throat in communication with the throat pressure annulus, and the pressure sensor communicates with the throat pressure annulus to detect pressure at the venturi throat.

2. The assembly of claim 1, wherein the at least one sensor comprises a differential pressure sensor configured to detect pressure drop between the inlet port and throat of the venturi, a throat pressure sensor configured to detect absolute pressure of gaseous fuel flowing through the throat, and a temperature sensor configured to detect temperature of gaseous fuel flowing through the venturi, the controller receiving sensor inputs from the differential pressure sensor, the throat pressure sensor, and the temperature sensor, and the processing module being configured to determine current mass flow rate using the sensor inputs.

3. The assembly of claim 1, wherein the venturi has a smooth, curved inner surface extending from the inlet port to the throat, and a smooth outwardly tapering surface extending from the throat to the venturi outlet.

4. The assembly of claim 2, wherein the passageway has an outwardly tapering surface portion extending from the venturi outlet to the flow control valve.

5. The assembly of claim 4, wherein the outwardly tapering surface portion of the passageway has a taper angle less than the taper angle of the smooth outwardly tapering surface of the venturi.

6. The assembly of claim 4, wherein the angle of the outwardly tapering surface of the venturi is in the range from approximately five degrees to approximately twenty degrees.

7. The assembly of claim 6, wherein the angle of the outwardly tapering surface portion of the venturi is approximately 15 degrees.

8. The assembly of claim 1, wherein the at least one sensor further comprises a differential pressure sensor and first and second ports connecting the differential pressure sensor to an inlet region of the venturi and to the throat pressure annulus, respectively.

9. The assembly of claim 1, wherein the throat is located closer to the inlet port than the venturi outlet.

10. The assembly of claim 9, wherein the distance between the venturi outlet and the flow control valve is at least two inches.

11. The assembly of claim 10, wherein the distance between the throat of the venturi and the flow control valve is at least five inches.

12. The assembly of claim 1, wherein the venturi throat diameter is in the range from 0.25 inches to 1.15 inches.

13. The assembly of claim 3, wherein the venturi throat has a diameter of approximately 0.95 inches and the angle of the smooth outwardly tapering surface of the venturi is approximately 8.5 degrees.

14. The assembly of claim 3, wherein the venturi throat has a diameter of approximately 0.25 inches and the angle of the smooth outwardly tapering surface of the venturi is approximately 20 degrees.

15. The assembly of claim 1, wherein the flow control valve comprises a butterfly valve rotatably mounted in the passageway and the adjustment device comprises a drive motor configured to rotate the butterfly valve to vary the effective flow area.

16. A gaseous fuel control assembly comprising:
   a flow control valve housing having a gaseous fuel inlet, a metered gaseous fuel outlet for fuel supply to an engine, and a passageway between the gaseous fuel inlet and outlet;
   a flow control valve mounted in the passageway having an adjustable flow area for metering flow of fuel to an engine, the flow control valve comprising a butterfly valve rotatably mounted in the passageway;
   an adjustment device associated with the flow control valve to adjust the effective flow area of the valve, the adjustment device comprising a drive motor configured to rotate the butterfly valve to vary the effective flow area, the drive motor having a drive shaft;

a flow measurement device having at least one fixed area orifice located upstream of the flow control valve, and at least one sensor associated with the orifice and configured to measure predetermined parameters of the fuel flowing through the orifice;

a controller which receives input from the at least one sensor and a fuel demand signal from the engine, the controller having a processing module for calculating current flow rate based on the sensor input, a comparator module which compares the calculated flow rate with the fuel demand signal, and a valve control module which controls the drive motor to adjust the flow area of the butterfly valve up or down depending on the difference between the calculated current flow rate and current fuel demand signal;

the butterfly valve comprising a disk and a butterfly shaft extending across the diameter of the disk and rotatably mounted across the passageway for rotation of the disk; and a coupler assembly which couples the drive shaft to the butterfly shaft and is configured to compensate for misalignment between the drive shaft and butterfly shaft.

17. The assembly of claim 16, wherein the coupler assembly has a first part having a central bore coupled to the drive shaft, a second part having a central bore coupled to the butterfly shaft, and spaced first and second connecting posts on opposite sides of the central bores which are loosely fitted in bores in the second part and first part, respectively, to compensate for misalignment between the drive shaft and butterfly shaft.

18. The assembly of claim 1, wherein the fixed area orifice comprises an orifice plate.

19. The assembly of claim 1, wherein the controller has an engine speed input for connection to an engine speed sensor, and the valve control module is further configured to adjust engine speed by control of the fuel input to the engine.

* * * * *